United States Patent
Choi et al.

(10) Patent No.: US 9,319,125 B2
(45) Date of Patent: Apr. 19, 2016

(54) METHOD AND APPARATUS OF WIRELESS COMMUNICATION BY USING MULTIPLE DIRECTIONAL ANTENNAS

(71) Applicant: Electronics and Telecommunications Research Institute, Daejeon-si (KR)

(72) Inventors: Jin Kyu Choi, Daejeon (KR); Seung Yong Lee, Daejeon (KR); Gwang Ja Jin, Daejeon (KR); Dae Seung Yoo, Yangsan-si (KR); Hyung Joo Kim, Daejeon (KR)

(73) Assignee: ELECTRONICS AND TELECOMMUNICATIONS RESEARCH INSTITUTE, Daejeon-Si (KR)

( * ) Notice: Subject to any disclaimer, the term of this patent is extended or adjusted under 35 U.S.C. 154(b) by 67 days.

(21) Appl. No.: 13/946,282

(22) Filed: Jul. 19, 2013

(65) Prior Publication Data
US 2014/0024320 A1    Jan. 23, 2014

(30) Foreign Application Priority Data

Jul. 19, 2012  (KR) .................. 10-2012-0078980
Jul. 12, 2013  (KR) .................. 10-2013-0082486

(51) Int. Cl.
*H04B 7/185* (2006.01)
*H04B 15/00* (2006.01)
*H04M 1/00* (2006.01)
(Continued)

(52) U.S. Cl.
CPC ............... *H04B 7/10* (2013.01); *H04B 7/0608* (2013.01); *H04B 7/0814* (2013.01); *H04B 7/0691* (2013.01); *H04B 7/0874* (2013.01)

(58) Field of Classification Search
CPC ....... H04B 7/10; H04B 7/0814; H04B 7/0857
USPC .............. 455/13.3, 25, 63.4, 73, 562.1, 575.7
See application file for complete search history.

(56) References Cited

U.S. PATENT DOCUMENTS 7,106,270 B2 *  9/2006  Iigusa et al. .................. 343/833
7,359,362 B2    4/2008  King et al.
(Continued)

FOREIGN PATENT DOCUMENTS

KR  10-2009-0058974  6/2009
KR  10-2009-0106450  10/2009
KR  10-2011-0139944  12/2011

*Primary Examiner* — Simon Nguyen
(74) *Attorney, Agent, or Firm* — Kile Park Reed & Houtteman PLLC

(57) ABSTRACT

The present invention relates to an apparatus and method of performing wireless communication using multiple directional antennas. The transportation means according to the present invention includes at least two communication devices, wherein one of the at least two communication devices, communication device A, includes a directional antenna group 1, and the other communication device, communication device B, includes a directional antenna group 2, and wherein the communication device A performs directional antenna selection control of the directional antenna group 1 included in the communication device A depending on whether the communication device B is connected with a network. According to the present invention, one of the communication devices gains access to a satellite station, a base station, or other ships, at least one antenna of another communication device may be used to relay wireless communication and may play a role as a base station or an AP.

18 Claims, 10 Drawing Sheets

(51) Int. Cl.
*H04B 7/10* (2006.01)
*H04B 7/06* (2006.01)
*H04B 7/08* (2006.01)

(56) References Cited

U.S. PATENT DOCUMENTS

| | | | |
|---|---|---|---|
| 7,825,858 B2 * | 11/2010 | Blessing et al. | 342/442 |
| 8,224,253 B2 * | 7/2012 | Ofek et al. | 455/63.4 |
| 8,675,617 B2 * | 3/2014 | Cha et al. | 370/338 |
| 8,842,050 B2 * | 9/2014 | Livneh et al. | 343/702 |
| 2003/0236096 A1 * | 12/2003 | Yamazaki | 455/456.6 |
| 2008/0122716 A1 * | 5/2008 | Berg et al. | 343/757 |
| 2013/0107820 A1 * | 5/2013 | Williams et al. | 370/329 |
| 2013/0234890 A1 * | 9/2013 | Chethik et al. | 342/374 |
| 2014/0022123 A1 * | 1/2014 | Bruder et al. | 342/359 |

\* cited by examiner

METHOD AND APPARATUS OF WIRELESS COMMUNICATION BY USING MULTIPLE DIRECTIONAL ANTENNAS

Priority to Korean patent application numbers 10-2012-0078980 filed on Jul. 19, 2012 and 10-2013-0082486 filed on Jul. 12, 2013 which is incorporated by reference herein, is claimed.

BACKGROUND OF THE INVENTION

1. Field of the Invention

The present invention relates to wireless communications, and more specifically, to a method of performing wireless communication using multiple directional antennas.

2. Discussion of the Related Art

As wired/wireless communication technology grows, various communication devices may happen to access a wide band communication network anytime and anywhere on land. However, despite a very old communication type, maritime communication systems are relatively slow in growth. Such maritime communication systems are mostly limited as providing voice-oriented communication services plus simple text transmission services.

It is difficult to establish the infrastructure for wired communication on the sea. Maritime communications cannot but rely on wireless communication-oriented services and make use of communication based on MF (Medium Frequency), HF (High Frequency), and VHF (Very High Frequency) bands due to limited arrival distance of wireless frequency. Long-distance sailing vessels rely on high-price satellite communications for telecommunication.

In the maritime communication field where such maritime communication systems apply, the GMDSS (Global Maritime Distress and Safety system) has been introduced since back in 1990.

The GMDSS which uses digital and satellite communication technology for safety of human beings on the sea allows a ship, although wrecked anywhere on the sea, to ask for rescue another nearby ship or an on-land rescue organization in a quick and exact manner. Further, the GMDSS allows for proper reception of information regarding sailing safety from the land.

Further, the IMO (International Maritime Organization) is now establishing a strategy for developing the E-navigation.

The E-navigation is a scheme that may collect, integrate, exchange, express, and analyzes various types of information with a ship by utilizing the AIS (Automatic Identification System) that enables real-time transmission/reception of a diversity of information related to characteristics, freight, and voyage of the ship. By utilizing this, a maritime ITS (International Transportation System) may be established that may encompass data and multimedia.

Further, telecommunication technology such as WLAN (Wireless Local Area Network), WiMAX (World Interoperability for Microwave Access) is considered for renewing maritime communication for ports and ships, and in recent years, the VHF band-based AIS associated with satellite is emerging as a maritime infra communication network.

SUMMARY OF THE INVENTION

An object of the present invention is to provide a method and apparatus of performing wireless communication using multiple directional antennas.

Another object of the present invention is to provide a method and apparatus of relaying wireless communication.

Still another object of the present invention is to provide a method and apparatus of relaying wireless communication using a plurality of communication devices.

Yet still another object of the present invention is to provide a method and apparatus of detecting a wireless communication direction in a wireless communication system.

Yet still another object of the present invention is to provide a method and apparatus of detecting a wireless communication direction using multiple directional antennas.

Yet still another object of the present invention is to provide a method and apparatus of relaying wireless communication using a plurality of frequency bands.

Yet still another object of the present invention is to provide a method and apparatus of performing wireless communication using multiple directional antennas in a maritime wireless communication system.

Yet still another object of the present invention is to provide a method and apparatus of detecting a direction using a plurality of directional antennas in a maritime wireless communication system.

Yet still another object of the present invention is to provide a method and apparatus of relaying wireless communication using multiple directional antennas in a maritime wireless communication system.

According to an aspect of the present invention, there is provided a communication device including multiple directional antennas. The communication device comprises an RSS measuring unit measuring an RSS (Received Signal Strength) of each of the multiple directional antennas, an antenna selecting unit selecting some of the multiple directional antennas based on the measured RSS, and an antenna switch performing connection control between the selected directional antennas and a communication unit, wherein the communication device is provided in a transportation means, wherein the transportation means further includes another communication device, and wherein the antenna selecting unit selects the selected directional antennas further based on whether the other communication device is connected with a network.

According to another aspect of the present invention, there is provided transportation means including at least two communication devices. In the transportation means, one of the at least two communication devices, communication device A, includes a directional antenna group 1, and the other communication device, communication device B, includes a directional antenna group 2, and wherein the communication device A performs directional antenna selection control of the directional antenna group 1 included in the communication device A depending on whether the communication device B is connected with a network.

According to still another aspect of the present invention, there is provided a directional antenna control method in a communication device having multiple directional antennas. The method comprises determining whether another communication device further provided in a transportation means in which the communication device is performed is connected to a network and performing selection control of a directional antenna based on whether the other communication device is connected to the network.

According to the present invention, multiple directional antennas may be used to detect the direction of a wireless signal, and a plurality of communication devices are used so that when one of the communication devices gains access to a satellite station, a base station, or other ships, directional antennas of another communication device may be used to relay wireless communication and may serve as a base station or an AP (Access Point).

According to the present invention, when detecting the direction a wireless signal, the RF (Radio Frequency) signal received through each directional antenna is measured, and the detection range is increased as compared with when the reception direction is detected with a non-directional antenna.

Further, compared with the scheme in which the direction detection is sequentially conducted per direction received by each directional antenna at the medium access control (MAC) layer as specified in the wireless LAN standard, 802.11ac, the present invention allows the strength received to be frequently measured by all the directional antennas, thus reducing the time and complexity for detection.

DETAILED DESCRIPTION OF THE EMBODIMENTS

Figure 1:
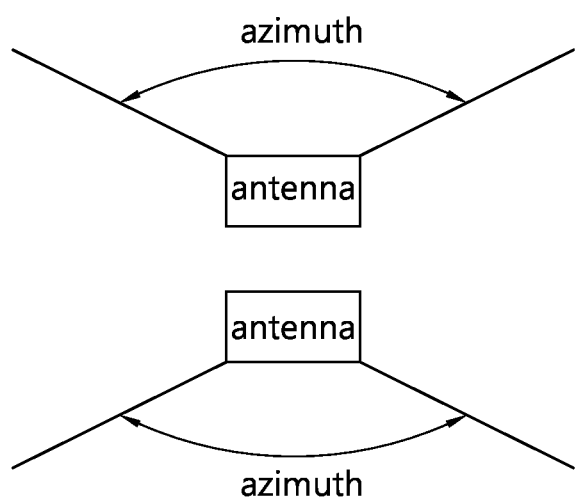
FIGS. 1 to 3 show examples of arrangement of directional antennas included in one communication device.

Hereinafter, some embodiments of the present invention will be described in detail with reference to the accompanying drawings. The same denotations may be used to refer to the same or substantially the same elements throughout the drawings. When determined to render the subject matter of this disclosure unclear, the detailed description of related known structures or functions are skipped.

As used herein, the terms "first," "second," "A," "B," "(a)," and "(b)" may be used only to distinguish an element from another, but such terms are not intended to limit the elements as having specific features or order. When an element is "connected," "combined," or "coupled" with another element, the element may be directly connected, "combined" or "coupled" with the other element, or (an)other element(s) may intervene therebetween.

The present invention uses a directional antenna having an azimuth and an elevation. VHF and HF-band communications use ionosphere reflection and LF and MF-band communications use the surface wave to enable communication to reach a place that is a few hundred kilometers away.

However, the ionosphere reflection does not occur at the VHF (Very High Frequency)/UHF (Ultra High Frequency)/SHF (Super High Frequency) band, so that communication may be performed through a direct wave using the troposphere and a wave reflected on the land surface, and there is a need for directional antennas having directivity for performing long-distance communication.

The present invention may be applied to inter-ship maritime wireless communication using a direct wave at, e.g., VHF/UHF/SHF bands. According to the present invention, in performing inter-ship wireless communication, multiple directional antennas may be used to conduct direction detecting, communication, and relaying.

For such purpose, the communication device according to the present invention may send out signals in all directions due to the nature of the maritime communication, and may conduct communication as long distance as possible.

A transportation means (e.g., ship) according to the present invention may have at least one, preferably, two or more communication devices, and each communication device may have multiple directional antennas.

The multiple directional antennas included in each communication device may be (horizontally) arranged to be oriented in different directions spaced apart from each other at a predetermined angle with respect to a predetermined rotational axis. In such case, the multiple directional antennas may be arranged in an external direction with respect to the rotational axis. Accordingly, each directional antenna fails to emit radio waves in all directions, but the multiple directional antennas may emit radio waves in all directions.

For example, four directional antennas (in case the number of the multiple directional antennas is n, n=4 hereinafter) having a directional angle of 90 degrees may be arranged to surround a predetermined rotational axis and to be oriented towards different directions. Or, six directional antennas (n=6) having a directional angle of 60 degrees may be arranged to be oriented in different directions, surrounding a predetermined rotational angle.

The directional angle and the number of directional antennas are merely an example, and directional antennas having a larger directional angle may be arranged so that some directional angles overlap each other, or directional antennas having a smaller directional angle may be used. Or, more or less directional antennas may be used. Or, the present invention may also apply although all or some of the directional antennas have different directional angles.

Figure 2:
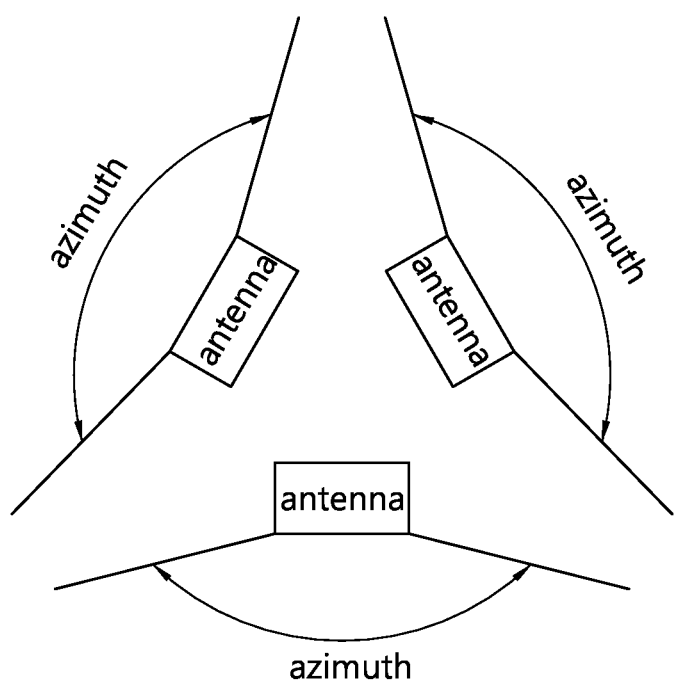
Figure 3:
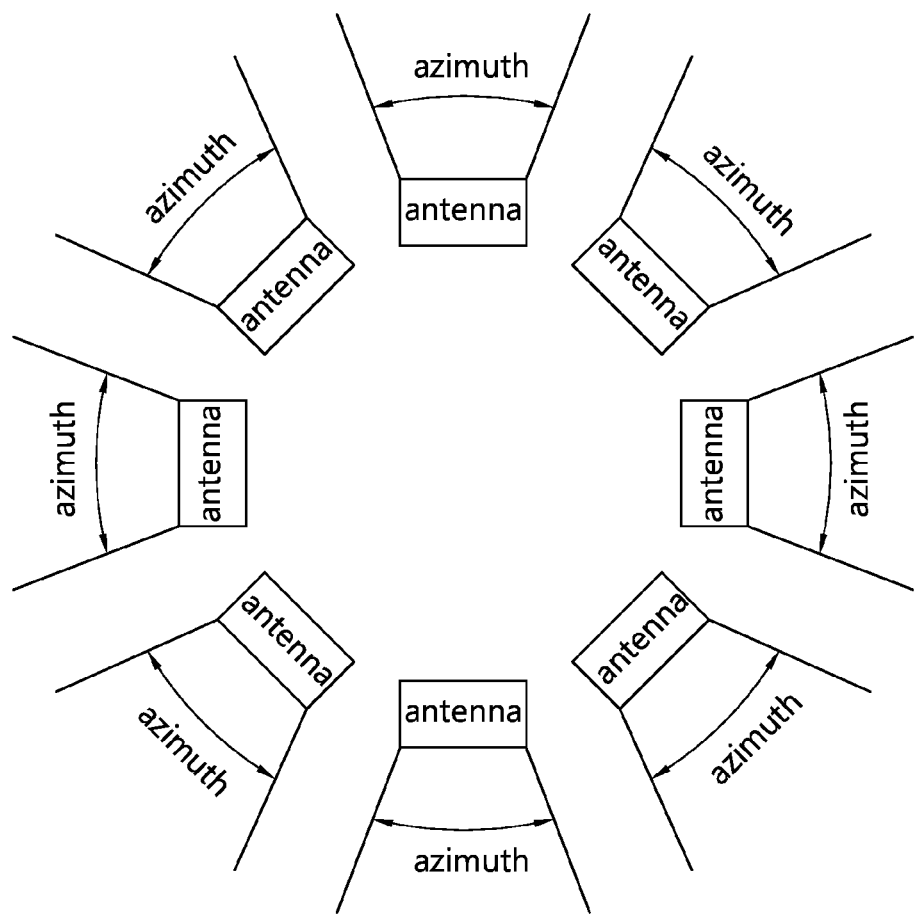

FIGS. 1 to 3 show examples of arrangement of directional antennas included in one communication device.

In case one communication device has two directional antennas, the two directional antennas may be arranged as shown in FIG. 1, in case one communication device has three directional antennas, the three directional antennas may be arranged as shown in FIG. 2, and in case one communication has eight directional antennas, the eight directional antennas may be arranged as shown in FIG. 3.

However, this is merely an example, and various numbers of directional antennas and directional antennas having various directional angles may be used as described above.

Meanwhile, the RF transmission power of one communication device may be restricted. In case a system with limited RF transmission power uses several directional antennas, as the number of antennas connected thereto decreases, the communication range may increase.

Figure 4:
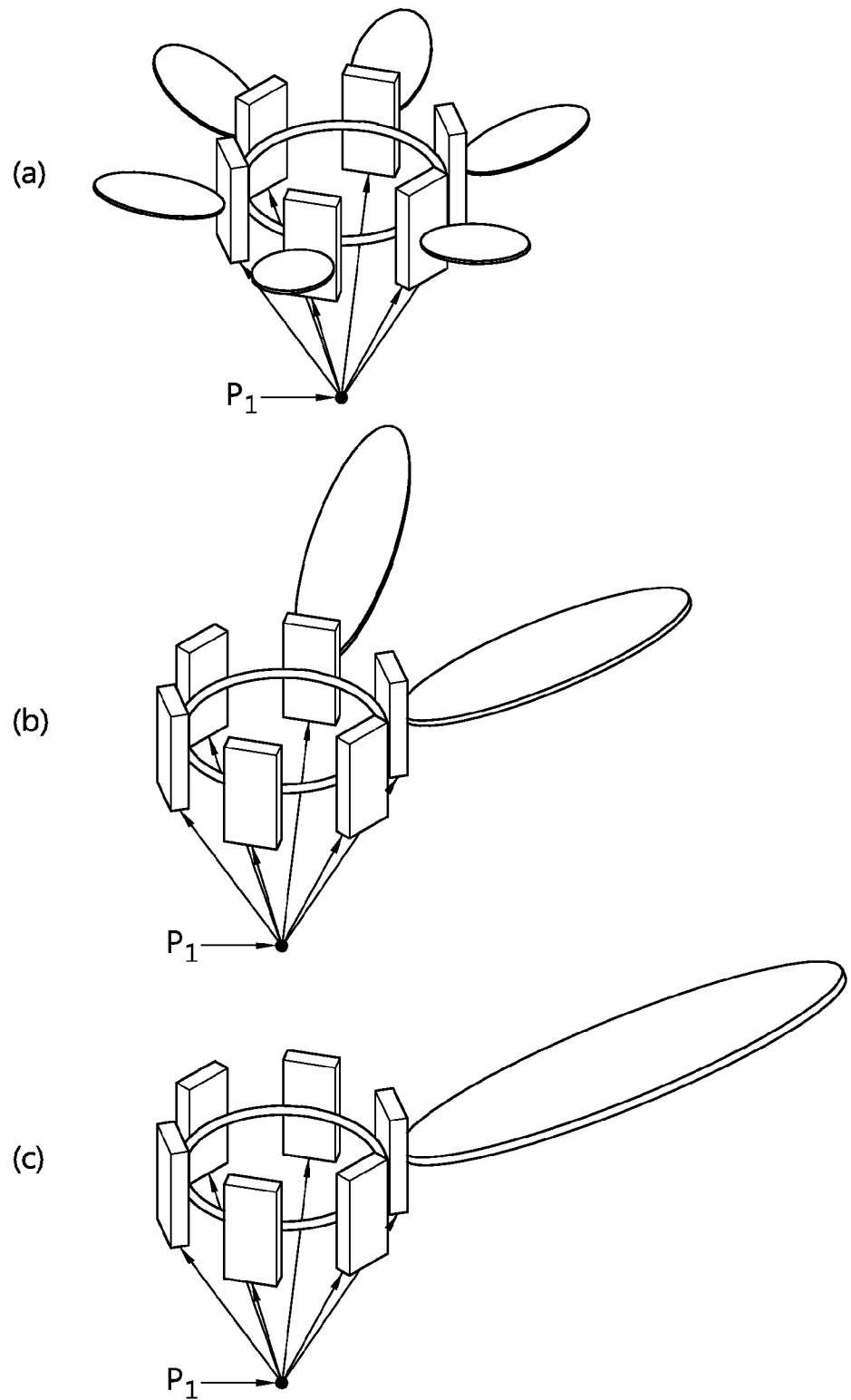
FIG. 4 shows an example of the communication range depending on the number of directional antennas used in a system with limited RF transmission power.

FIG. 4 shows an example of the communication range depending on the number of directional antennas used in a system with limited RF transmission power.

Referring to FIG. 4, in using multiple directional antennas, with respect to some transmission RF power, (a) depicts the communication range when all of the directional antennas are used to propagate radio waves in all directions, (b) depicts the communication range when two directional antennas are used to propagate radio waves, and (c) depicts the communication range when one directional antenna is used to propagate radio waves. FIG. 4 illustrates the property in that the communication range is increased in cases (b) and (c) where one or some directional antennas are used to propagate radio waves rather than in case (a) where all of the directional antennas are used to propagate radio waves in all directions.

The communication device according to the present invention may adjust the communication range using the above-described characteristics. The multiple directional antennas are provided in the communication device according to the present invention. The communication device may detect the direction of wireless communication on the sea through the multiple directional antennas and may perform wireless communication and relaying.

Hereinafter, an embodiment of the present invention in which at least two communication devices are mounted on a ship to perform wireless communication according to the present invention is described. However, this is an example, and one communication device or three or more communication devices may be mounted on a ship or may be mounted on a different type of transportation means to perform wireless communication according to the present invention.

Figure 5:
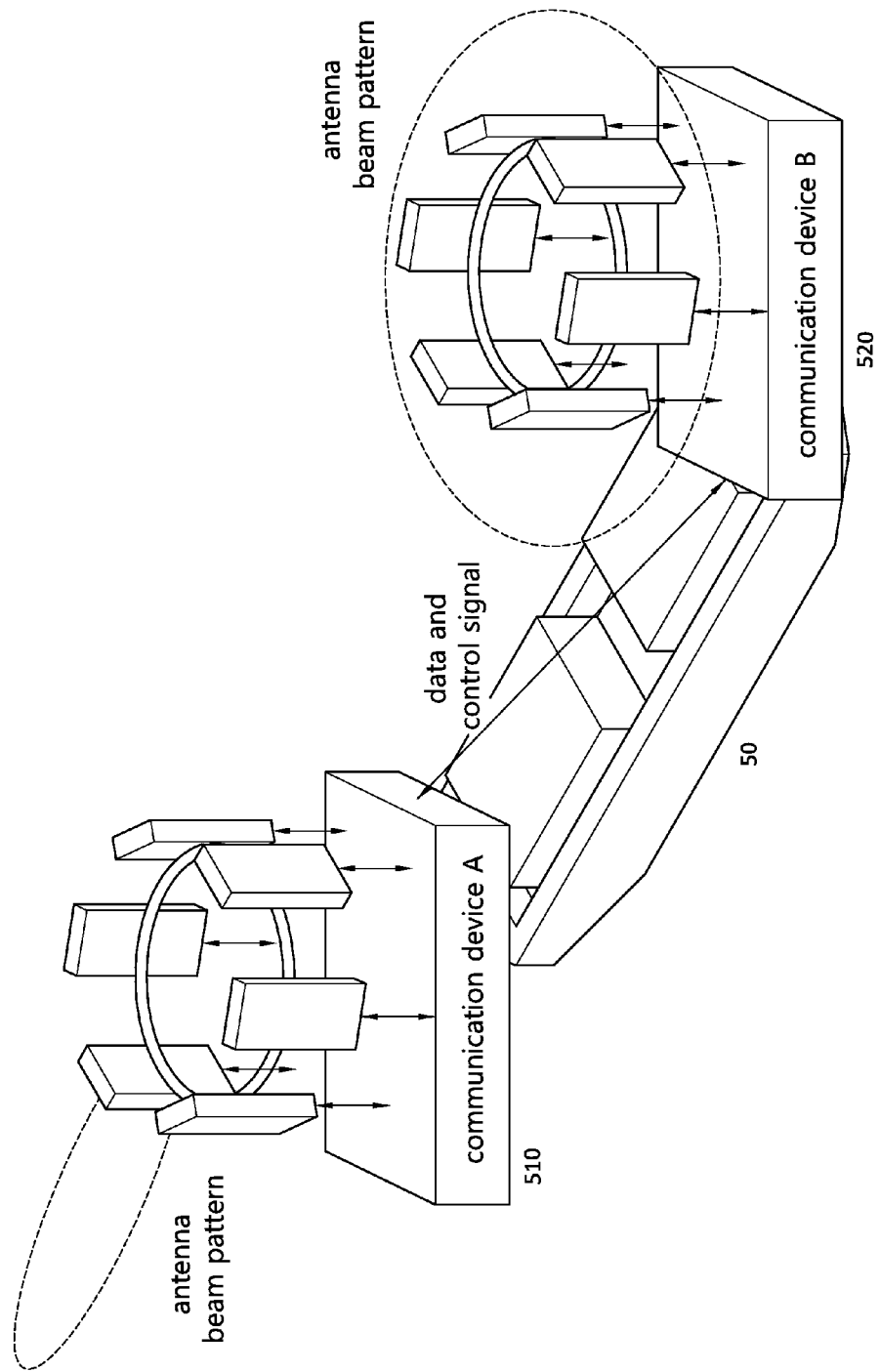
FIG. 5 shows an example where two communication devices are mounted on a ship and perform wireless communication according to the present invention.

FIG. 5 shows an example where two communication devices are mounted on a ship and perform wireless communication according to the present invention.

Referring to FIG. 5, one ship 50 has two communication devices 510 and 520 mounted thereon. In such case, one of the two communication devices 510 and 520 may be referred to as communication device A 510, and the other thereof may be referred to as communication device B 520. The communication devices 510 and 520 in the ship are connected to each other so that they may transmit/receive communication data and control signals to/from each other.

Further, the communication devices 510 and 520 respectively may establish communication links independent from each other. For example, the communication device A 510 may form a communication link with a terrestrial base station, a maritime base station, or a satellite station. The communication device B 520 may form a communication link with other ships or other types of transportation means.

There may be various types of communication links that may be created on the sea. For example, the communication links may include a communication link between a terrestrial base station and a maritime ship, a communication link between a maritime base station and a maritime ship, a communication link between a satellite station and a maritime ship, a communication link with a terrestrial base station or a maritime base station or a satellite station or a ship connected to another ship, and a communication link between ships without other links.

Figure 6:
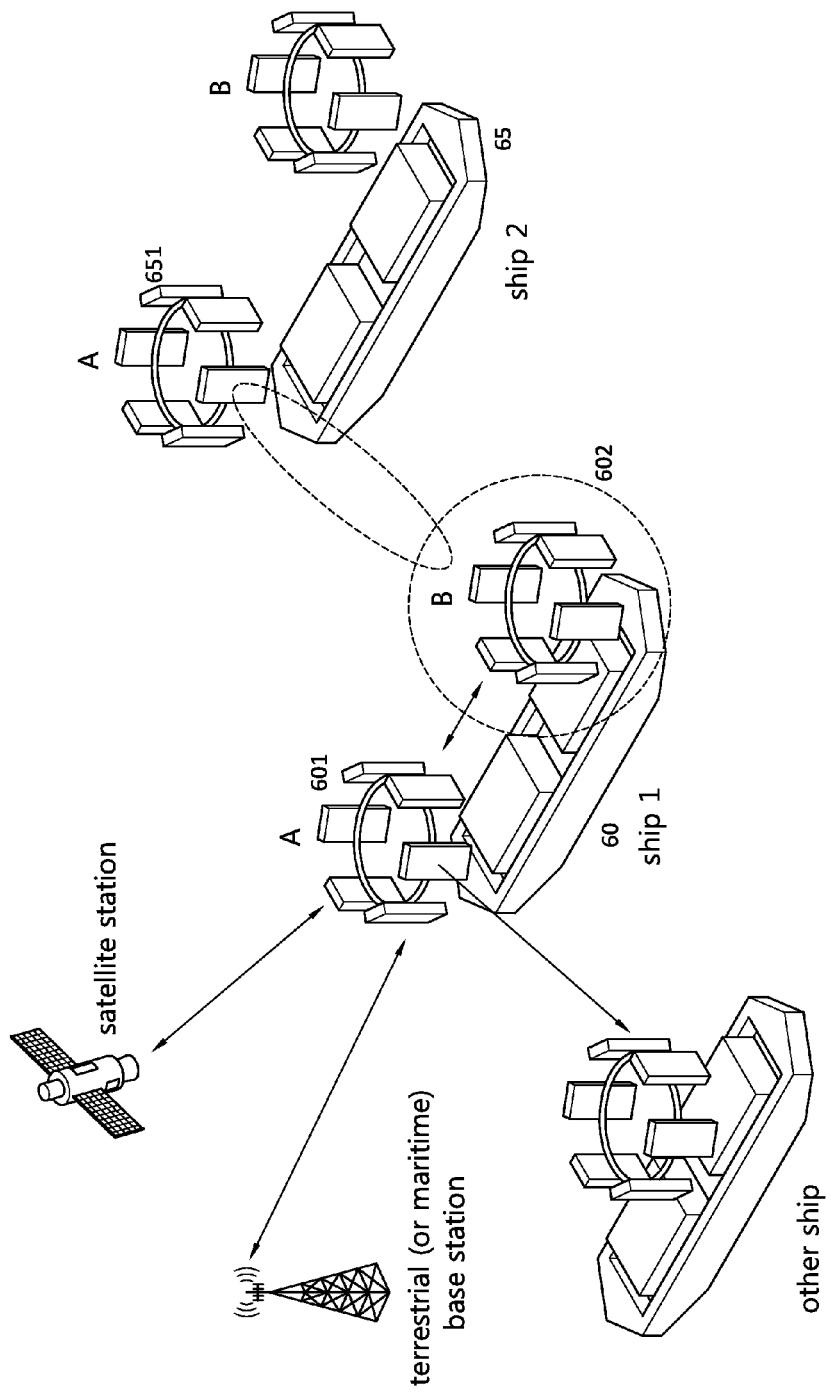
FIG. 6 shows an example of the configuration of a communication link between ship 1 and ship 2 according to the present invention.

FIG. 6 shows an example of the configuration of a communication link between ship 1 and ship 2 according to the present invention.

Referring to FIG. 6, in case the communication device A 601 of the ship 1 60 is connected to a terrestrial base station, a maritime base station, a satellite station, or another ship, the ship 1 60 may constitute a communication link with the communication device A 651 of the ship 2 65 through the communication device B 602.

The communication device B 602 of the ship 1 60 may be operated with the following structure.

Figure 7:
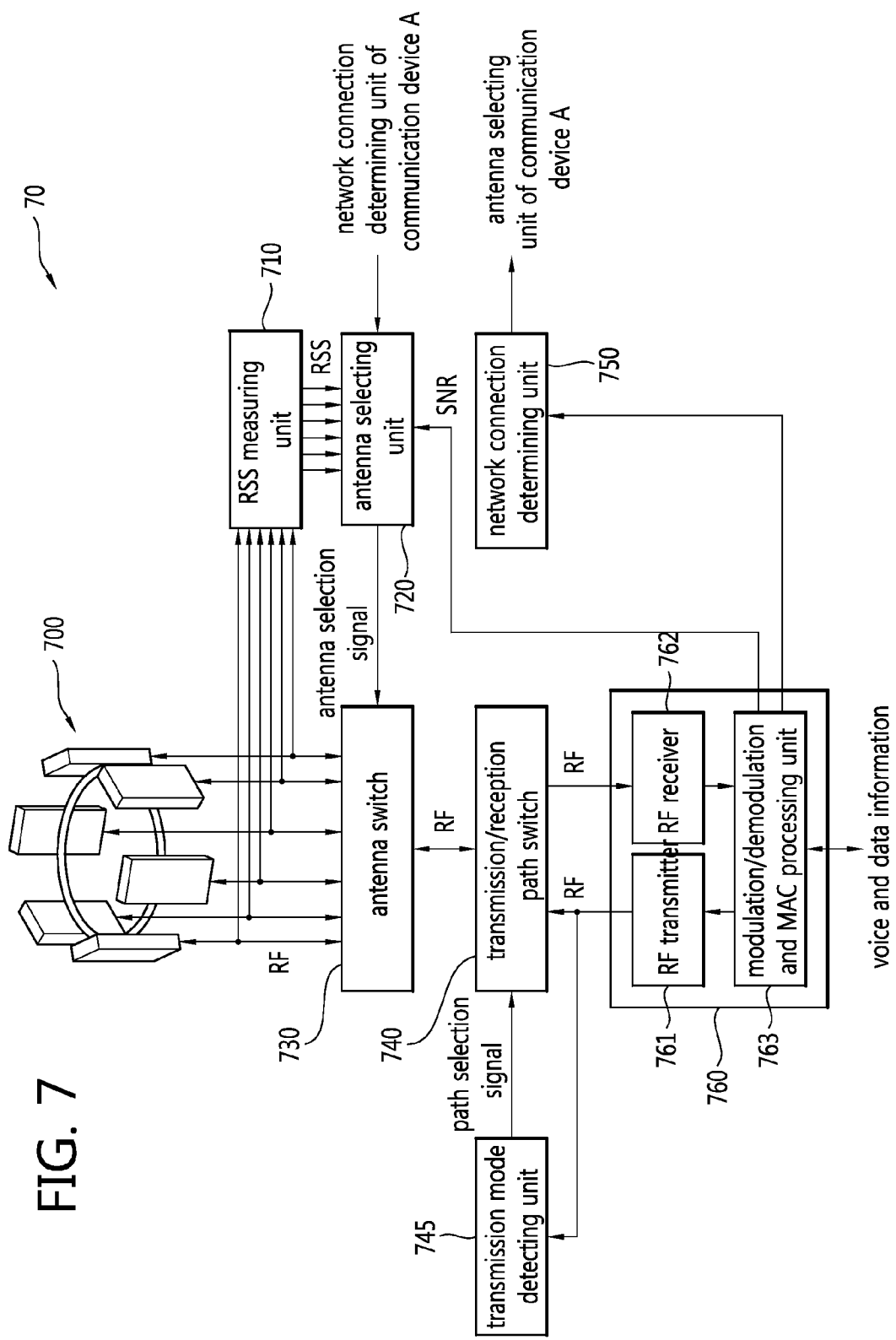
FIG. 7 illustrates an example of the structure of a communication device B of ship 1 performing wireless communication according to the present invention.

FIG. 7 illustrates an example of the structure of a communication device B of ship 1 performing wireless communication according to the present invention.

Referring to FIG. 7, the communication device 70 according to the present invention includes multiple directional antennas 700, an RSS (Received Signal Strength) measuring unit 710, an antenna selecting unit 720, an antenna switch 730, a transmission/reception path switch 740, a transmission mode detecting unit 745, a network connection determining unit 750, and a communication unit 760. The communication unit 760 includes an RF transmitter 761, an RF receiver 762, and a modulation/demodulation MAC processing unit 763.

The multiple directional antennas 700 may be (horizontally) arranged to be oriented in different directions at a predetermined angle with respect to a predetermined rotational axis as described above. The multiple directional antennas 700 may be arranged to be oriented in an external direction with respect to the predetermined rotational axis. The multiple directional antennas 700 may propagate radio waves in all directions through all of the multiple directional antennas or may propagate radio waves only in a specific direction through a specific directional antenna as described above in connection with FIG. 4.

The RSS measuring unit 710 may measure the received signal strength (RSS) of an RF signal received through each directional antenna. The RSS measuring unit 710 transfers the RSS for each directional antenna to the antenna selecting unit.

The antenna selecting unit 720 selects a directional antenna to be used for communication considering the RSS of each directional antenna as measured by the RSS measuring unit 710, and transfers the antenna selection signal to the antenna switch 730. In such case, the antenna selecting unit 720 may further consider an SNR (Signal to Noise Ratio) measured by the communication unit 760 when selecting the directional antenna. Specifically, by way of example, the SNR may be measured by the modulation/demodulation and MAC processing unit 763 included in the communication unit 760.

Meanwhile, the antenna selecting unit 720 receives information on whether the communication device A forms a (wireless) communication link with a terrestrial base station, a maritime base station, a satellite station, or other ships through the network connection determining unit of the communication device A mounted on the same ship, and based on this, may control the selection of an antenna.

The antenna switch 730 conducts control based on the antenna selection signal received from the antenna selecting unit 720 so that the communication unit 760 is connected with the selected directional antenna. Specifically, the antenna switch 730 may conduct control so that at least one of the RF transmitter 761 and the RF receiver 762 is connected with the selected directional antenna.

Specifically, by way of example, the antenna switch 730 may be connected with the transmission/reception path switch 740, and the transmission/reception path switch 740 may be connected with at least one of the RF transmitter 761 and the RF receiver 762. In such case, the transmission mode detecting unit 745 is further connected with the transmission/reception path switch 740 and may transfer a path selection signal to the transmission/reception path switch 740. The transmission/reception path switch 740 may perform connection control with at least one of the RF transmitter 761 and the RF receiver 762 based on the path selection signal.

The modulation/demodulation and MAC processing unit 763 is connected with the RF transmitter 761 and the RF receiver 762 and performs modulation or demodulation of a transmitted/received communication signal. The modulation/demodulation and MAC processing unit 763, by way of example, may modulate voice and data information and may send it to the RF transmitter 761, and may extract the voice and data information by demodulating the signal received from the RF receiver 762.

Meanwhile, the network connection determining unit 750 determines whether the communication device B 70 forms a communication link with a terrestrial base station, a maritime base station, a satellite station, or other ships and informs it to the communication device A of the ship having the communication device B 70. Specifically, by way of example, the network connection determining unit 750 is connected to the modulation/demodulation and MAC processing unit 763, and based on the signal processing performed by the modulation/demodulation and MAC processing unit 763, may generate information on whether the communication device B 70 forms a communication link, and the network connection determining unit 750 may wirelessly or wiredly transmit the information on whether the communication device B 70 forms a communication link to the antenna selecting unit of the communication device A.

Figure 8:
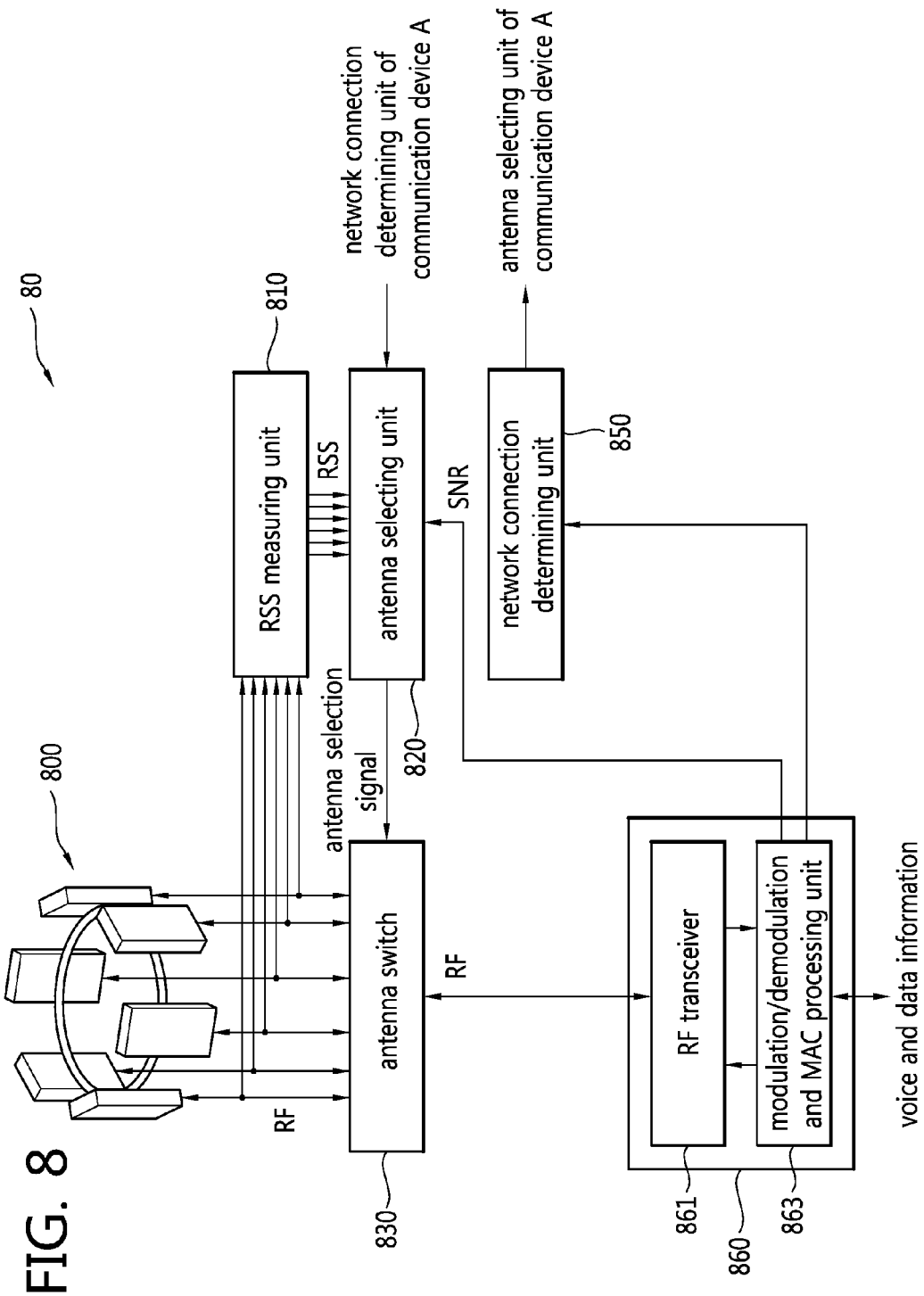
FIG. 8 shows another example of the configuration of the communication device B of ship 1 performing wireless communication according to the present invention.

Meanwhile, the transmission/reception path switch 740 might be omitted as shown in FIG. 8 in some cases.

FIG. 8 shows another example of the configuration of the communication device B of ship 1 performing wireless communication according to the present invention.

Referring to FIG. 8, the communication device B 80 according to the present invention includes multiple directional antennas 800, an RSS measuring unit 810, an antenna selecting unit 820, an antenna switch 830, a network connection determining unit 850, and a communication unit 860. The communication unit 860 includes an RF transceiver 861 and a modulation/demodulation and MAC processing unit 863.

In FIG. 8, one RF transceiver 861 is connected with the antenna switch 830 and controls RF transmission and reception. The antenna switch 830 conducts control based on an antenna selection signal received from the antenna selecting unit 820 so that the communication unit 860, particularly the RF transceiver 861 is connected with the selected directional antenna.

The modulation/demodulation and MAC processing unit 863 is connected with the RF transceiver 860 and performs modulation and demodulation on a transmitted and received communication signal. The modulation/demodulation and MAC processing unit 863, for example, may modulate voice and data information and may send it to the RF transceiver 861 and may extract the voice and data information by demodulating a signal received from the RF transceiver 861.

Meanwhile, the antenna selecting unit according to the present invention may select a directional antenna, by way of example, by the following method. Hereinafter, the description is made based on the antenna selecting unit. However, selecting an antenna may also be performed by a communication device including the antenna selecting unit.

Figure 9:
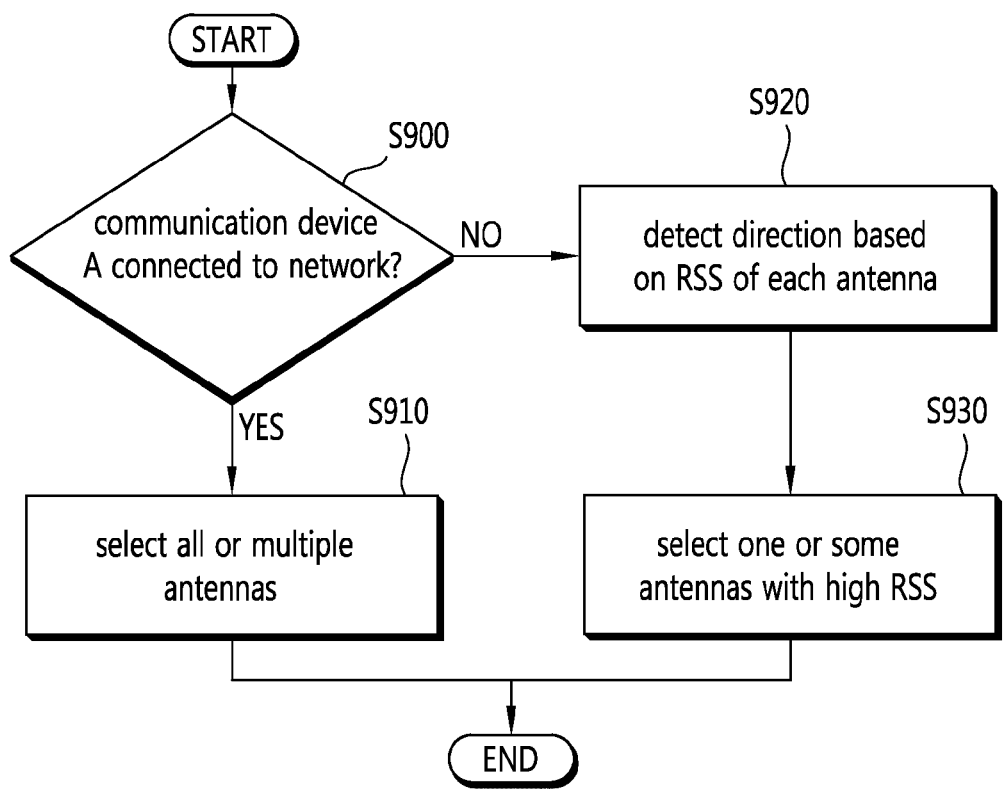
FIG. 9 shows an example of an antenna selecting method performed by an antenna selecting unit according to the present invention.

FIG. 9 shows an example of an antenna selecting method performed by an antenna selecting unit according to the present invention. FIG. 9 may illustrate an example in which the communication device B is not connected with a terrestrial base station, a maritime base station, a satellite station, or other ships. In FIG. 9, the antenna selecting unit is provided in the communication device B. In FIG. 9, the communication device A means another communication device mounted on the ship having the communication device B mounted thereon.

Referring to FIG. 9, the antenna selecting unit identifies whether the communication device A stays connected to a network (S900). In other words, the antenna selecting unit identifies whether the communication device A forms a communication link. That is, the antenna selecting unit identifies whether the communication device A establishes a communication link with a terrestrial base station, a maritime base station, a satellite station, or other ships.

In case it is determined in step S900 that the communication device A is connected with a network, the antenna selecting unit selects all directional antennas or multiple directional antennas (S910). This may be, e.g., for the purpose of the communication device B transmitting a signal received through the network to which the communication device A is connected to other ships. That is, for some other ships to be able to detect the direction, the antenna selecting unit may select all directional antennas or multiple directional antennas and the communication device B may radiate RF signals in all directions.

In case it is not determined in step S900 that the communication device A is connected to the network, the antenna selecting unit performs direction detection based on the RSS of each antenna (S920) and selects one or some directional antennas having high RSS (S930), e.g., in order for the communication device B to be able to newly gain connection with the network. That is, the communication device B may constitute a communication link with a terrestrial base station, a maritime base station, a satellite station, or other ships through the selected antenna. Here, "selecting a directional antenna having high RSS" may include "selecting a directional antenna having the highest RSS" or "selecting a directional antenna having a specific value or more of RSS."

Figure 10:
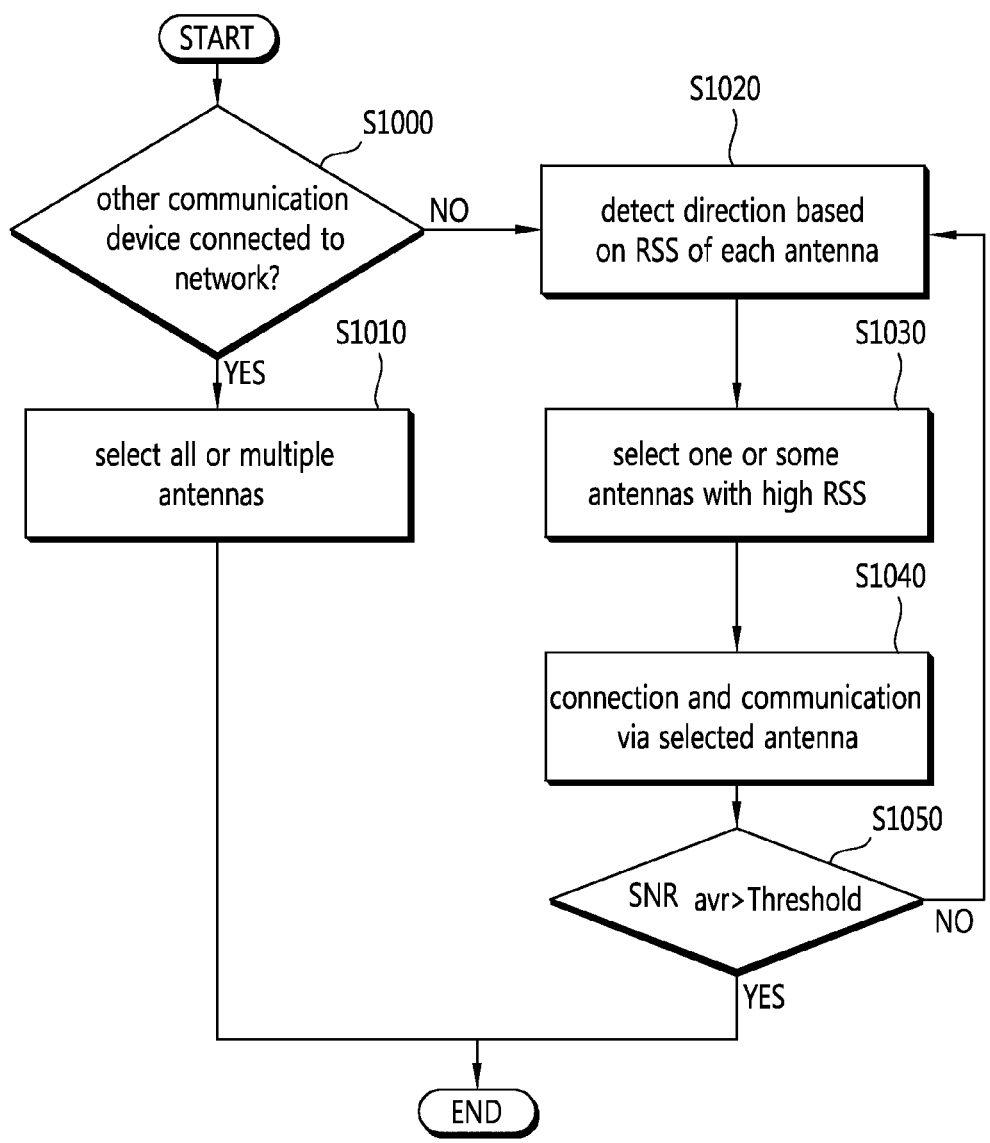
FIG. 10 illustrates an example of a method of controlling a directional antenna performed in a communication device according to the present invention.

FIG. 10 illustrates an example of a method of controlling a directional antenna performed in a communication device according to the present invention. FIG. 10 may illustrate an example in which a communication device is not connected with a terrestrial base station, a maritime base station, a satellite station, or other ships. In FIG. 10, other communication devices are mounted on the ship having the above-described communication device mounted thereon.

Referring to FIG. 10, the communication device identifies whether another communication device is connected to the network (S1000). In other words, the antenna selecting unit identifies whether another communication device forms a communication link. That is, the antenna selecting unit identifies whether another communication device constitutes a communication link with a terrestrial base station, a maritime base station, a satellite station, or other ships.

In case it is determined in step S1000 that another communication device is connected to the network, the communication device selects all the directional antenna or multiple directional antennas (S1010), e.g., in order for the communication device to transmit a signal received through the network to which the other communication device is connected to other ships. That is, in order for another ship to detect a direction, the communication device may select all the directional antennas or plural directional antennas and may radiate RF signals in all directions.

In case it is determined in step S1000 that the other communication device is not connected to the network, the communication device performs direction detection based on the RSS of each antenna (S1020), and selects one or some directional antennas having high RSS (S1030). This is, by way of example, for the purpose of the communication device to be newly connected to the network. That is, the communication device may constitute a communication link with a terrestrial base station, a maritime base station, a satellite station, or other ships through the selected directional antenna.

The communication device gains access to the network through the selected directional antenna and performs communication (S1040). The communication device may perform communication with a terrestrial base station, a maritime base station, a satellite station, or other ships (i.e., transmission and reception of wireless signals) through the selected directional antenna.

The communication device identifies whether the signal quality ($SNR_{avr}$) of communication signals goes lower than a predetermined threshold (S1050). The communication device may periodically identify whether the signal quality is lower than the predetermined threshold. If the signal quality is lower than the predetermined threshold, the communication device goes back step S1020 and performs step S1020 and its subsequent steps. That is, if the signal quality is lower than the predetermined threshold, the communication device performs the RSS-based direction detection again, and may select one or some directional antennas having high RSS, thereby conducting communication.

As described above, according to the present invention, multiple directional antennas may be used to detect the direction of wireless signals, and in case a plurality of communication devices are used so that one of the communication devices is connected with a satellite station, a base station, or other ships, the directional antennas of other communication devices may be used to relay wireless communication while playing a role as a base station or an AP.

Further, according to the present invention, in detecting the direction of wireless signals, the RF signal received by each directional antenna is measured, and thus, the detection range may be increased as compared with when the reception direction is detected by non-directional antennas. Further, the present invention may measure the strength of received signals may be measured by all the directional antennas at times, thus reducing the detection time and complexity for detection.

Although embodiments of the present invention have been described, it should be understood by those skilled in the art that various modifications and variations may be made thereto without departing from the scope of the present invention. Thus, the embodiments of the present invention described above should not be construed as limiting the present invention, and rather as provided to make the present invention understood by those skilled in the art, and it should be also understood that all equivalents to the present invention are also included in the scope of the present invention.

What is claimed is:

1. A transportation means including a first communication device including multiple directional antennas, and a second communication device, the first communication device comprising:
    a received signal strength measuring unit measuring a received signal strength of each of the multiple directional antennas to generate measured received signal strengths;
    a network communication determination unit determining whether the first communication device is connected to a network to generate connection status information of whether the first communication device is connected to the network;
    an antenna selecting unit generating an antenna selection signal based on the measured received signal strengths received from the received signal strength measuring unit and connection status information received from a network communication determination unit of the second communication device; and
    an antenna switch performing connection control between at least one of the multiple directional antennas and a communication unit based on the antenna selection signal received from the antenna selecting unit.

2. The transportation means of claim 1, wherein the communication unit performs network connection and wireless communication through the selected antennas.

3. The transportation means of claim 2, wherein the multiple directional antennas are arranged in different external directions at a predetermined or any angular interval with respect to a predetermined rotational axis.

4. The transportation means of claim 3, wherein the communication unit includes radio frequency transmitter and a radio frequency receiver, the first communication device further comprising a transmission/reception path switch performing connection control of the selected antennas and at least one of the radio frequency transmitter and the radio frequency receiver depending on whether the communication unit is in a transmission mode or in a reception mode.

5. The transportation means of claim 3, wherein the transportation means is a ship, and wherein the communication unit performs communication using a direct wave at a very high frequency, ultra high frequency, or super high frequency band.

6. The transportation means of claim 1, wherein the multiple directional antennas included in the first communication device are arranged in different external directions at a predetermined or any angular interval with respect to a predetermined rotational axis.

7. The transportation means of claim 6, wherein in a case where the second communication device is connected with a network, the first communication device selects all of the multiple directional antennas included in the first communication device and radiates a radio frequency signal in all directions.

8. The transportation means of claim 7, wherein in a case where the second communication device is not connected with a network, the first communication device measures a received signal strength of each of the multiple directional antennas in the first communication device, selects one or some directional antennas having a highest measured received signal strength or having a measured received signal strength equal to or greater than a specific received signal strength value, and performs wireless communication through the selected directional antenna.

9. The transportation means of claim 8, wherein the transportation means is a ship, and wherein the first communication device performs the wireless communication using a direct wave at a very high frequency, ultra high frequency, or super high frequency band.

10. A directional antenna control method in a transportation means including a first communication device having multiple directional antennas, and a second communication device, the method comprising:
    determining, by the first communication device, whether the second communication device connected to a network to generate connection status information of whether the second communication device is connected to the network;
    measuring, by the first communication device, a received signal strength of the multiple directional antennas to generate measured received signal strengths in a case where the second communication device is not connected to the network;
    generating, by the first communication device, an antenna selection signal based on the measured received signal strengths and the connection status information of the second communication device; and
    performing, by the first communication device, selection control of a directional antenna based the antenna selection signal.

11. The directional antenna control method of claim 10, wherein the multiple directional antennas are provided to be oriented in different external directions at a predetermined or any angular interval with respect to a predetermined rotational axis.

12. The directional antenna control method of claim 11, wherein in a case where the second communication device is connected with the network, all of the multiple directional antennas are selected.

13. The directional antenna control method of claim 12, wherein radio frequency signals are radiated in all directions through all of the selected multiple directional antennas.

14. The directional antenna control method of claim 11, wherein performing selection control of the directional antenna based the antenna selection signal further comprises selecting one or some directional antennas having a highest measured received signal strength or having a measured received signal strength equal to or greater than a specific received signal strength value.

15. The directional antenna control method of claim 14, further comprising performing, by the first communication device, wireless communication by connection to the network via the selected directional antenna.

16. The directional antenna control method of claim 15, wherein the transportation means is a ship, and wherein the wireless communication is performed using a direct wave at a very high frequency, ultra high frequency, or super high frequency band.

17. The directional antenna control method of claim 15, further comprising:

measuring, by the first communication device, a signal quality of the wireless communication; and re-measuring a received signal strength of the multiple directional antennas in a case where the signal quality is a predetermined threshold or less, wherein one or some directional antennas, having a highest re-measured received signal strength or having a re-measured received signal strength equal to or greater than a specific received signal strength value, are re-selected.

18. The directional antenna control method of claim 17, wherein the signal quality is periodically measured.

\* \* \* \* \*